United States Patent [19]

Miller

[11] 4,148,036

[45] Apr. 3, 1979

[54] MAGNETIC QUADRAPOLE ANTENNA

[76] Inventor: Wendell S. Miller, 1341 Comstock Ave., Los Angeles, Calif. 90024

[21] Appl. No.: 207,992

[22] Filed: Jul. 6, 1962

[51] Int. Cl.[2] .......................... H01Q 7/08; H04B 5/00

[52] U.S. Cl. ...................................... 343/788; 178/43; 179/82; 343/856; 343/867

[58] Field of Search ............... 343/787, 788, 866, 867, 343/895, 100, 112; 325/179, 371; 178/43; 179/82

[56] References Cited

U.S. PATENT DOCUMENTS

| | | | |
|---|---|---|---|
| 746,985 | 3/1956 | Blaupunkit | 343/787 |
| 2,122,145 | 6/1938 | Kear et al. | 179/82 |
| 2,406,360 | 8/1946 | Ellwood | 179/82 |
| 3,078,348 | 2/1963 | McIntosh | 343/788 X |

*Primary Examiner*—Maynard R. Wilbur
*Assistant Examiner*—Richard E. Berger
*Attorney, Agent, or Firm*—William P. Green

[57] ABSTRACT

1. The combination comprising a pair of magnetic dipole antennae of substantially equal radiation strength in proximate but offset relation and oriented with their axes extending in a common direction, and an oscillating current source operatively connected to both of said antennae to drive them simultaneously but in opposed phase relationship, whereby the dipole moments of said antennae substantially cancel one another so that the antennae function together to produce a magnetic quadrapole radiation substantially free of any dipole movement.

13 Claims, 3 Drawing Figures

WENDELL S. MILLER
INVENTOR.

BY William P. Green
ATTORNEY

WENDELL S. MILLER
INVENTOR.

BY William P. Green
ATTORNEY

MAGNETIC QUADRAPOLE ANTENNA

This invention relates to an improved type of radio transmitter structure, and particularly to improvements in antennae for such transmitters.

In using radio transmitters, there are certain situations in which it is desirable to transmit messages over relatively short distances, but to purposely avoid the transmission of these messages to greater distances. For instance, in various tactical military situations, troops may desire to transmit messages back-and-forth over small distances, without the messages being intercepted or received by the enemy. With conventional transmitter systems, it is very difficult to assure against transmission of a message beyond a predetermined range without at the same time so weakening the transmitted signal as to materially detract from the effectiveness with which the message is transmitted over the desired shorter range.

The general object of the present invention is to provide an improved antenna system which is designed for transmission with high efficiency over short distances, but which has a sharp drop-off in signal intensity beyond the effective transmission range, so that the signal can not be received satisfactorily beyond that range. The fall-off in signal intensity is extremely abrupt, and much more rapid than with conventional transmitting antennae, so that the transmitter is for all intents and purposes limited to a very short transmission range, but within that range is fully effective to transmit messages with high intensity.

To achieve the above results, I utilize a unique antenna arrangement of the magnetic type, which is designed to function as a multi-pole (more than two-pole) magnetic antenna, and which in addition is purposely designed to be substantially free of magnetic dipole radiation. Preferably, the antenna is also substantially free of electric dipole radiation or electric quadrapole radiation. Best results are achieved when the antenna functions primarily as a magnetic quadrapole. When the antenna thus functions as a magnetic quadrapole, this quadrapole radiation inherently has the desired high intensity signal characteristics at short range, with an abrupt fall off in signal intensity when the range increases beyond a predetermined very short effective transmission distance, to thereby achieve the above discussed results for which the invention is intended.

To produce magnetic quadrapole radiation without magnetic dipole radiation, I employ a pair of magnetic dipole antennae of substantially equal radiating strength so positioned that their dipole moments cancel out one another, leaving only the quadrapole signal for transmission. As a result, a receiver responds only to the quadrapole moment, so that the effective transmission range of the system depends substantially entirely on the characteristics of quadrapole radiation.

Where a transmitter embodying the invention is to be utilized as a portable short-range transmitter for military or other use, it may be that the transmitter will under some circumstances be brought close enough to bodies of electrically conducting or magnetic material to tend to unbalance the opposed magnetic dipoles in a manner such that they no longer completely cancel one another out, with the result that they commence to emit dipole radiation along with the quadrapole radiation. To eliminate this possibility, one form of the present invention includes automatic compensating equipment, adapted to automatically respond to the development of any such dipole radiation, and functioning to produce an opposed corrective dipole counteracting the unbalanced condition to reinstate the overall system to the desired quadrapole condition without substantial dipole radiation.

The significance of the terminology, in this specification and the appended claims, relating to magnetic dipole radiation and magnetic quadrapole radiation, and to dipole and quadrapole moments or components of radiation, will of course be readily understood by those skilled in the art, inasmuch as it is completely conventional to refer to magnetic radiation as consisting of a series of components including the dipole component, the quadrapole component, the octapole component, and other multipole components of increasingly higher order. As an example of one well known text in the field containing a discussion of the radiation components of different order which may be emitted by an antenna, reference is made to the standard text "Electromagnetic Theory" by Julius Adams Stratton, First Edition, and particularly to pages 431 through 434 thereof, as well as sections 3.8 to 3.12 and sections 4.4. to 4.7.

The above and other features and objects of the present invention will be better understood from the following detailed description of the typical embodiments illustrated in the accompanying drawing, in which.

Figure 1:
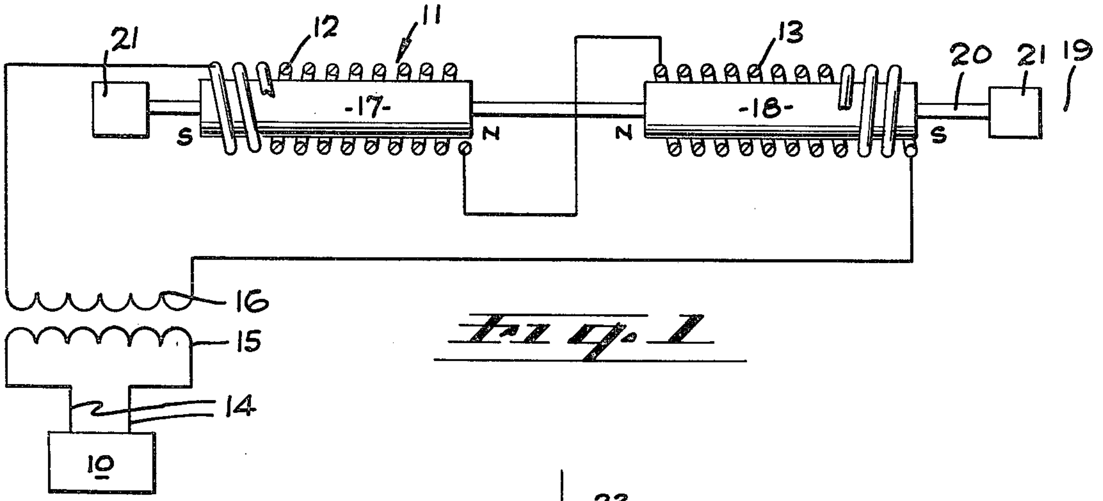
FIG. 1 is a schematic representation of a magnetic quadrapole antenna system constructed in accordance with the invention.

With reference to FIG. 1, the apparatus shown in that figure includes a transmitter 10 which may be conventional in every respect except with regard to the type of antenna connected to the transmitter. The antenna system is represented at 11, and includes two magnetic dipoles 12 and 13 connected and mounted in opposed relation.

The transmitter 10 is desirably intended for transmitting signals of relatively low frequency, say for example under about 20 meters wave length. It is contemplated that the main application of the present invention will probably be for such low frequency use. The signal developed by transmitter 10 is fed to a pair of leads 14 connected to a coil 15 which is inductively coupled to a coacting coil 16 to induce a corresponding signal in that second coil. The signal is of course in the form of the usual alternating current carrier wave of the particular frequency or frequency range for which the transmitter is designed, having the message information impressed on the carrier wave.

The signal is fed from coil 16 to the two dipoles 12 and 13, which are wound about two identical cores 17 and 18 formed of ferrite or the like. The coils 12 and 13 themselves are also identical, consisting of the same number of turns of the same kind of wire, except that they are wound in opposite directions. Thus, when a current flows in a particular direction through the two coils 12 and 13 in series, the left end of one coil forms a north pole while the right end of the opposite coil forms a north pole. One magnetic condition of the two poles is represented in FIG. 1 in which both of the coils are represented as having north poles at their adjacent ends and south poles at their outer ends.

Though it is possible to utilize other relative orientations of the two coils and still achieve the desired cancelling out of the dipole moments, I prefer that the two coils and their cores 17 and 18 all be centered about a common straight line axis 19, and be spaced apart along that axis as shown. Any suitable means may be provided for mounting the cores and coils in this relation, as by providing a nonmagnetic rod 20 extending entirely through both of the cores to carry them and mounted to suitable stationary supports represented at 21.

To assure the adequacy and completeness of the present disclosure, the following specific example is given as an illustration of one particular coil and core arrangment which may be employed in accordance with the invention:

(1) Diameter of cores 17 and 18—1″

(2) Length of cores 17 and 18—10″

(3) Coils 12 and 13—200 turns of B. & S. guage 22 enameled wire;

(4) Frequency of transmission—1 megacycle

When the apparatus of FIG. 1 is in use, the oscillating or alternating current signal within coils 17 and 18 causes these coils to each produce a magnetic dipole radiation. Together, the two dipoles, in the illustrated opposed relation, produce an overall magnetic quadrapole radiation which can be sensed by a receiver within the designed short range transmission area of the transmitter, but as stated before can not be received beyond that designed range.

If a dipole radiation were also present in the signal emitted from transmitter 10, that dipole radiation could of course be received very well beyond the quadrapole range, with gradual rather than abrupt drop-off characteristics, and would therefore destroy the desired short-range effectiveness of the quadrapole moment. However, when the coils and their cores are mounted in their illustrated arrangement, the dipole moments of the two coils exactly counteract one another, and cancel out, so that there is no such dipole moment emitted from the antenna. Consequently, the antenna functions substantially entirely as a magnetic quadrapole, and achieves the results which have been discussed hereinbefore.

Figure 2:
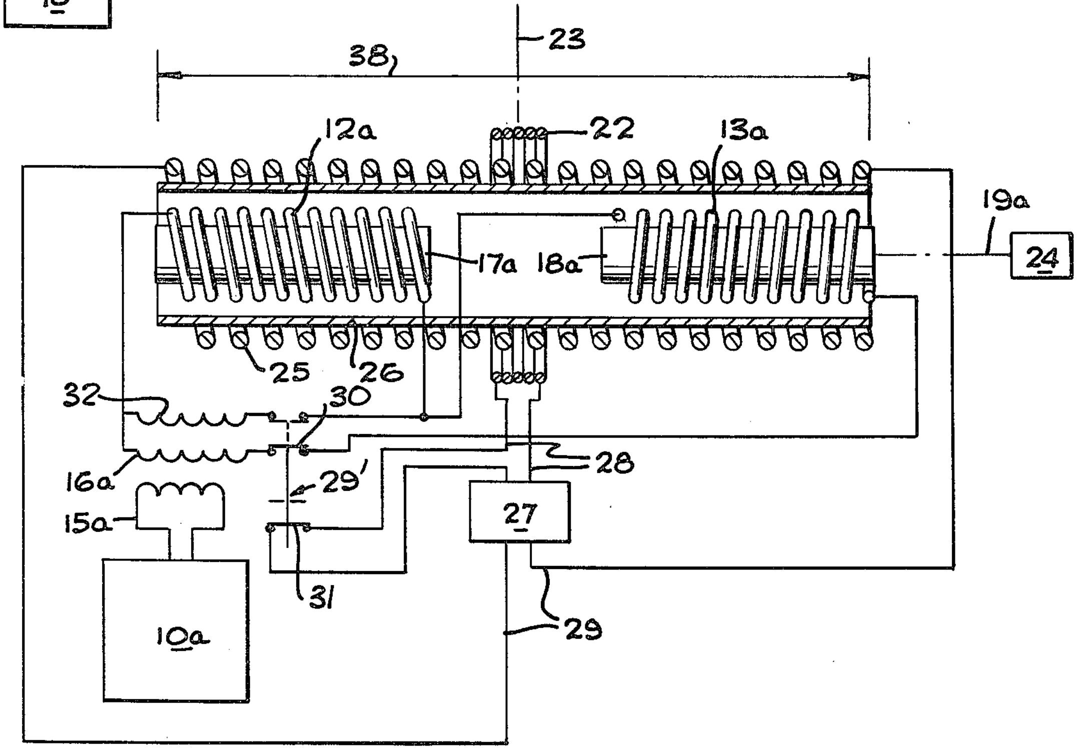
FIG. 2 is a circuit diagram representing a second form of the invention.

FIG. 2 illustrates the circuit of a variational form of the invention, which is essentially the same as that of FIG. 1 except for the addition of compensating means for automatically correcting unbalance in the system resulting from the presence of electrically conductive material or magnetic material in the vicinity of the antenna. The transmitter 10*a*, coils 15*a* and 16*a*, cores 17*a* and 18*a* of magnetic material, and antenna coils 12*a* and 13*a* of FIG. 2 may all be identical with the corresponding elements 10, 15, 16, 17, 18, 12 and 13 respectively of FIG. 1. In addition to these components, the FIG. 2 arrangement has certain additional equipment, including a sensing coil 22 which is positioned to determine the presence of a magnetic dipole field produced by coils 12*a* and 13*a*, but will not respond to their magnetic quadrapole field. For this purpose, coil 22 is located at the node of the quadrapole induction field. To be located at that node, coil 22 may be centered about axis 19*a* of the antenna coils 12*a* and 13*a*, and may lie in a plane 23 disposed transversely of axis 19*a* and located midway between the proximate ends of the two cores 17*a* and 18*a*, and the two coils 12*a* and 13*a*. In view of the positioning of coil 22 at the node of the quadrapole field, coil 22 will not respond to the quadrapole field, but will respond to the presence of a dipole field which may result from an unbalance in the magnetic effects of the two coils 12*a* and 13*a*. Thus, if a body of magnetic or conducting material is moved to a position near coils 12*a* and 13*a*, such as to the location represented at 24 in FIG. 2, this may cause the dipole field of one of the coils 12*a* or 13*a* to become stronger than the other, so that the two fields do not exactly cancel out at the node location at which coil 22 is located, and consequently an electrical potential and current are induced in sensing coil 22 by the unbalanced dipole field.

When sensing coil 22 thus detects the presence of an unbalanced magnetic dipole field in the vicinity of the antenna, coil 22 corrects this effect by causing the production of a counteracting dipole field about coils 12*a* and 13*a* of a value just sufficient to counteract the detected field and return the overall dipole output, as detected by coil 22, to substantially zero. The compensating dipole field is produced by a coil 25 which may be centered about the same axis 19*a* as are coils 12*a* and 13*a*, and which preferably extends from the left end of core 17*a* and coil 12*a* to the right end of coil 13*a* and core 18*a*. As in the case of the other coils, successive turns of coil 25 should be of uniform spacing along the length of the coil. Also, coil 25 may either be wrapped directly onto the outside of cores 17*a* and 18*a*, and main coils 12*a* and 13*a*, or be wrapped about an outer tube 26 disposed about axis 19*a* and typically formed of a nonmagnetic and electrically nonconductive substance such as a suitable resinous plastic material.

To cause appropriate energization of coil 25 to compensate for any dipole field detected by sensing coil 22, the signal from coil 22 is fed into a suitable automatic response circuit represented at 27, which circuit may be a conventional automatic negative feed-back system. Thus, when a signal reaches the feed-back system 27 from coil 22 through leads 28, the feed-back system 27 acts to produce in its output leads 29 which are connected to compensating coil 25 a current which is opposed to the induced current in coil 22, and which is of a value sufficient to exactly counterbalance the detected dipole field, and reduce the effective dipole field to zero. In this way, only the magnetic quadrapole field remains, and the overall circuit therefore functions as a magnetic quadrapole antenna system in the manner discussed in connection with FIG. 1.

When it is desired to convert the quadrapole antenna system of FIG. 2 to a dipole condition, for transmitting signals over an extended range, this may be effected by actuation of a suitable switch 29 between the full line position of FIG. 2 and the broken line position. In the full line position, the upper contact 30 of switch 29 closes the circuit between pick-up coil 16*a* and the two antenna coils 12*a* and 13*a*, so that the coils 12*a* and 13*a* may function as a quadrapole, as discussed. Also, in the full line position of switch 29′, lower contact 31 of that switch closes the circuit between coil 22 and feed-back system 27, to allow for automatic response of the apparatus to compensate for an unbalance between coils 12*a* and 13*a*. When switch 29′ is moved upwardly to its broken line position, contact 30 opens the main circuit from coil 16*a* to coils 12*a* and 13*a*, and closes a circuit from a second signal pick-up or coupling coil 32 (magnetically linked to coil 15*a*) to the single antenna coil 12*a*. Coil 12*a* is properly matched to coil 32, and the antenna coil 12*a* therefore may now function as a simple dipole antenna.

Figure 3:
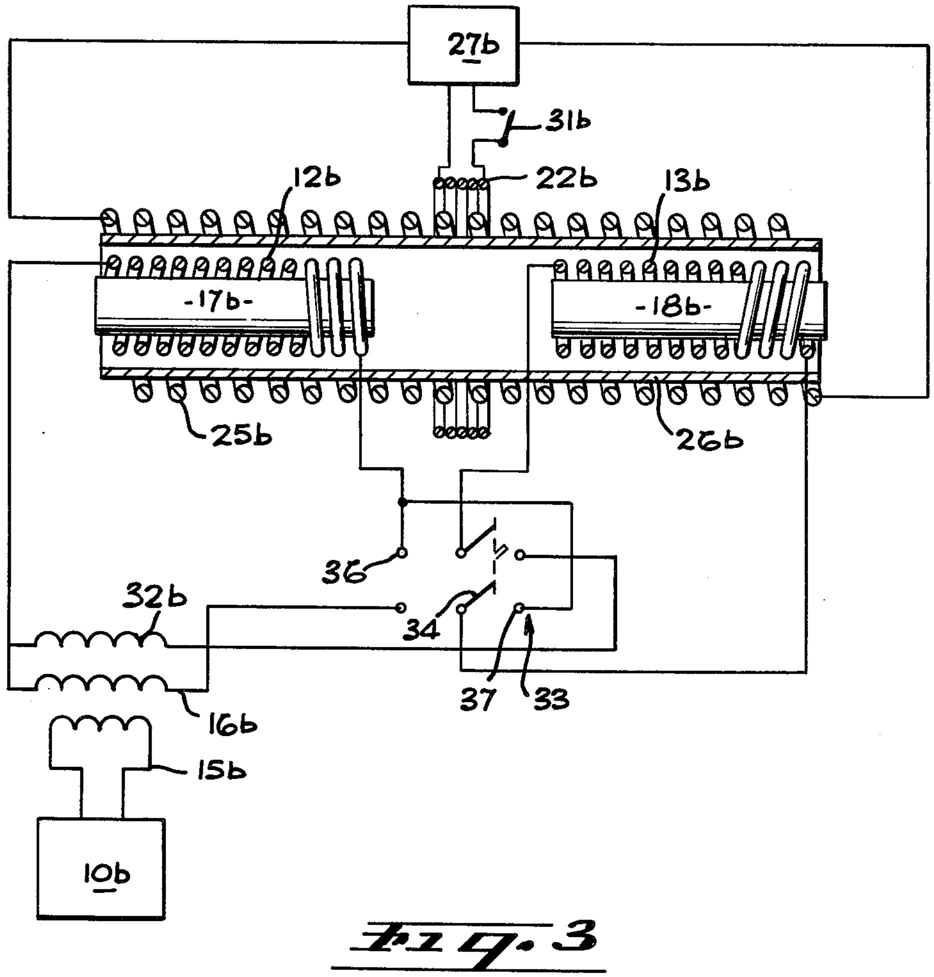
FIG. 3 is a similar diagram showing a third form of the invention.

If desired, instead of using only one coil in this manner for the dipole condition, a switching system may be provided for reversing the connections between coils 12*a* and 13*a* so that current passes through them in a common direction, and their dipole fields therefore supplement one another rather than cancelling out, to produce a composite increased strength dipole field. Such an arrangement is shown in FIG. 3. In this arrangement, elements **10*b*, 12*b*, 13*b*, 15*b*, 16*b*, 17*b*, 18*b*, 22*b*, 25*b*, 27*b*, and 32*b* may be identical with the corresponding parts of FIG. 2. Also, a switch 31*b* may be connected into the automatic response line from coil 22*b* to feed-back system 27*b*, to allow opening of this circuit when the apparatus is in its dipole condition. For reversing the connections between coils 12*b* and 13*b*, I provide a reversing switch 33, whose double pole double throw switch arm 34 acts when in engagement with a left set of contacts 36 to close a circuit from pick-up or coupling coil 16*b* through coils 12*b* and 13*b*, with the latter two coils connected reversely for quadrapole operation. When arm 34 is swung into contact with contacts 37, coils 12*b* and 13*b* are connected into a series circuit in which their magnetic effects supplement one another, to form together a magnetic dipole for long range operation, with these two coils receiving their signal from a matching or coupling coil 32*b*.**

It is contemplated that the two coils 12 and 13 of FIG. 1, or their equivalents in the other forms of the invention, may if desired be displaced to positions in which their axes are not aligned with one another but are parallel and offset, though the aligned conditions illustrated are preferred.

As stated previously, the advantages of the invention are attained with maximum effectiveness when the frequency being transmitted is relatively low. Stated differently, it is preferred for best operation that the transmitted wave length be substantial as compared with the physical dimensions of the antenna system. Specifically to avoid the development of an unwanted dipole moment, it is desirable that the wave length of the transmitted radiation be at least about as great as the maximum linear dimension 38 of the two antenna coils, 12 and 13 (or their equivalent) as a unit.

I claim:

1. The combination comprising a pair of magnetic dipole antennae of substantially equal radiation strength in proximate but offset relation and oriented with their axes extending in a common direction, and an oscillating current source operatively connected to both of said antennae to drive them simultaneously but in opposed phase relationship, whereby the dipole moments of said antennae substantially cancel one another so that the antennae function together to produce a magnetic quadrapole radiation substantially free of any dipole moment.

2. The combination comprising a pair of magnetic dipole antennae of substantially equal radiation strength in proximate but offset relation and oriented with their axes extending in a common direction, an oscillating current source operatively connected to both of said antennae to drive them simultaneously but in opposed phase relationship, whereby the dipole moments of said antennae substantially cancel one another so that the antennae function together to produce a magnetic quadrapole radiation substantially free of any dipole moment means for responding to a condition of unbalance between said antennae tending to produce a dipole moment, and compensating means automatically actuable by said last mentioned means to produce a compensating dipole radiation counteracting said dipole moment.

3. The combination comprising a pair of magnetic dipole antennae of substantially equal radiation strength in proximate but offset relation and oriented with their axes extending in a common direction, an oscillating current source operatively connected to both of said antennae to drive them simultaneously but in opposed phase relationship, whereby the dipole moments of said antennae substantially cancel one another so that the antennae function together to produce a magnetic quadrapole radiation substantially free of any dipole moment, a sensing coil positioned at the node of said quadrapole radiation for responding to a condition of unbalance between said antennae tending to produce a dipole moment, and compensating means automatically actuable by said sensing coil to produce a compensating dipole radiation counteracting said dipole moment.

4. The combination comprising a pair of magnetic dipole antennae of substantially equal radiation strength in proximate but offset relation and oriented with their axes extending in a common direction, an oscillating current source operatively connected to both of said antennae to drive them simultaneously but in opposed phase relationship, whereby the dipole moments of said antennae, substantially cancel one another so that the antennae function together to produce a magnetic quadrapole radiation substantially free of any dipole moment, means for responding to a condition of unbalance between said antennae tending to produce a dipole moment, and compensating means automatically actuable by said last mentioned means to produce a compensating dipole radiation counteracting said dipole moment, said compensating means including a correcting coil for producing said compensating dipole radiation, and means for feeding current to said correcting coil upon energization of said sensing coil.

5. The combination comprising a pair of magnetic dipole antennae of substantially equal radiation strength in proximate but offset relation and oriented with their axes extending in a common direction, an oscillating current source operatively connected to both of said antennae to drive them simultaneously but in opposed phase relationship, whereby the dipole moments of said antennae, substantially cancel one another so that the antennae function together to produce a magnetic quadrapole radiation substantially free of any dipole moment, means for responding to a condition of unbalance between said antennae tending to produce a dipole moment, and compensating means automatically actuable by said last means automatically actuable by said last mentioned means to produce a compensating dipole radiation counteracting said dipole moment, said compensating means including a correcting coil for producing said compensating dipole radiation, and an automatic reverse feedback system for feeding current to said correcting coil upon energization of said sensing coil.

6. The combination comprising a pair of magnetic dipole antennae of substantially equal radiation strength in proximate but offset relation and oriented with their axes extending in a common direction, an oscillating current source operatively connected to both of said antennae to drive them simultaneously but in opposed phase relationship, whereby the dipole moments of said antennae substantially cancel one another so that the antennae function together to produce a magnetic quadrapole radiation substantially free of any dipole moment, a sensing coil positioned at the node of said quadrapole radiation for responding to a condition of unbalance between said antennae tending to produce a dipole moment, and compensating means automatically actuable by said sensing coil to produce a compensating dipole radiation counteracting said dipole moment.

7. The combination comprising a pair of magnetic dipole antennae of substantially equal radiation strength in proximate but offset relation and oriented with their axes extending in a common direction, and an oscillating current source operatively connected to both of said antennae to drive them simultaneously but in opposed phase relationship and operable to feed them an electromagnetic signal of a wave length at least two times as great as the maximum linear dimension of said two antennae as a unit, whereby the dipole moments of said antennae substantially cancel one another so that the antennae function together to produce a magnetic quadrapole radiation substantially free of any dipole moment.

8. The combination comprising a pair of magnetic dipole antennae of substantially equal radiation strength in proximate but offset relation and oriented with their axes extending in a common direction, an oscillating current source operatively connected to both of said antennae to drive them simultaneously but in opposed phase relationship, whereby the dipole moments of said antennae substantially cancel one another so that the antennae function together to produce a magnetic quadrapole radiation substantially free of any dipole moment, and switching means for breaking the circuit through said two antennae by which they are driven in opposed phase relationship and instead connecting at least one of said antennae to said current source for energization as a magnetic dipole.

9. The combination comprising a pair of magnetic dipole antennae of substantially equal radiation strength in axially aligned spaced but proximate positions, and an oscillating current source operatively connected to both of said antennae to drive them simultaneously but in opposed phase relationship, whereby the dipole moments of said antennae substantially cancel one another so that the antennae function together to produce a magnetic quadrapole radiation substantially free of any dipole moment.

10. The combination comprising a pair of magnetic dipole antennae of substantially equal radiation strength in proximate but offset relation and oriented with their axes extending in a common direction, an oscillating current source operatively connected to both of said antennae to drive them simultaneously but in opposed phase relationship, whereby the dipole moments of said antennae substantially cancel one another so that the antennae function together to produce a magnetic quadrapole radiation substantiallly free of any dipole moment, and a correcting coil operable if a condition of unbalance develops between said two dipole antennae to produce a dipole movement compensating therefor.

11. The combination comprising a pair of magnetic dipole antennae of substantially equal radiation strength in axially aligned spaced but proximate positions, an oscillating current source operatively connected to both of said antennae to drive them simultaneously but in opposed phase relationship, whereby the dipole moments of said antennae substantially cancel one another so that the antennae function together to produce a magnetic quadrapole radiation substantially free of any moment, and a correcting coil disposed about said two antennae and operable if a condition of unbalance develops between said two dipole antennae to produce a dipole moment compensating therefor.

12. The combination comprising a pair of magnetic dipole antenna of substantially equal radiation strength in axially aligned spaced but proximate positions, an oscillating current source operatively connected to both of said antennae to drive them simultaneously but in opposed phase relationship, whereby the dipole moments of said antennae substantially cancel one another so that the antennae function together to produce a magnetic quadrapole radiation substantially free of any dipole moment, a sensing coil positioned at the node of said quadrapole radiation for responding to a condition of unbalance between said antennae tending to produce a dipole moment, and compensating means automatically actuable by said sensing coil to produce a compensating dipole radiation counteracting said dipole moment, said compensating means including a correcting coil disposed about said two antennae for producing said compensating dipole radiation, and means for feeding current to said correcting coil upon energization of said sensing coil.

13. The combination comprising a pair of magnetic dipole antennae of substantially equal radiation strength in axially aligned spaced but proximate positions, an oscillating current source operatively connected to both of said antennae to drive them simultaneously but in opposed phase relationship, whereby the dipole moments of said antennae substantially cancel one another so that the antennae function together to produce a magentic quadrapole radiation substantially free of any dipole moment, a sensing coil positioned at the node of said quadrapole radiation for responding to a condition of unbalance between said antennae tending to produce a dipole moment, compensating means automatically actuable by said sensing coil to produce a compensating dipole radiation counteracting said dipole moment, said compensating means including a correcting coil disposed about said two antennae for producing said compensating dipole radiation, and means for feeding current to said correcting coil upon energization of said sensing coil, and switching means for breaking the circuit through said two antennae by which they are driven in opposed phase relationship and instead connecting at least one of said antennae to said current source for energization as a magnetic dipole.

* * * * *